United States Patent [19]

Kissin

[11] Patent Number: 6,153,550

[45] Date of Patent: *Nov. 28, 2000

[54] OLEFIN POLYMERIZATION CATALYST BASED ON METALLOCENE COMPLEXES AND PERFLUORINATED OLIGOARYL DERIVATIVES OF ALUMINATES

[75] Inventor: Yury V Kissin, East Brunswick, N.J.

[73] Assignee: Mobile Oil Corporation, Fairfax, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 08/993,168

[22] Filed: Dec. 18, 1997

[51] Int. Cl.$^7$ ................................ C08F 4/02; C08F 4/60; B01J 31/00; B01J 37/00

[52] U.S. Cl. .................... 502/103; 502/111; 502/117; 526/160; 526/943; 556/175; 556/176; 556/179; 556/181; 556/182

[58] Field of Search ...................... 502/103, 111, 502/117, 125; 556/175, 176, 179, 181, 182

[56] References Cited

U.S. PATENT DOCUMENTS

| | | | |
|---|---|---|---|
| 2,744,074 | 5/1956 | Theobald | 260/2 |
| 2,979,497 | 4/1961 | Rinse | 260/97.5 |
| 4,732,993 | 3/1988 | Malpass et al. | 556/181 |
| 5,258,475 | 11/1993 | Kissin | 526/129 |
| 5,326,837 | 7/1994 | Kissin | 526/150 |
| 5,391,793 | 2/1995 | Marks et al. | 556/179 |
| 5,397,757 | 3/1995 | Mink | 502/115 |
| 5,416,229 | 5/1995 | Tran | 556/179 |
| 5,506,184 | 4/1996 | Kissin et al. | 502/115 |
| 5,550,094 | 8/1996 | Ali et al. | 502/115 |
| 5,777,143 | 7/1998 | Malpass et al. | 556/179 |
| 5,831,109 | 11/1998 | Smith et al. | 556/179 |
| 5,962,362 | 10/1999 | Wasserman et al. | 502/117 |
| 6,015,766 | 1/2000 | Kissin | 502/117 |

FOREIGN PATENT DOCUMENTS

| | | | |
|---|---|---|---|
| 58-85830 | 5/1983 | Japan . | |
| WO 94/10180 | 5/1994 | WIPO | 556/179 |

OTHER PUBLICATIONS

D.G. Hendershot et al., Organometallics, vol. 10, pp. 1917–1922, 1991.

N.N. Greenwood and A. Earnshaw, "Chemistry of the Elements", Pergamon Press, Oxford, pp. 273–277 and 289, 1984.

PCT International Search Report, Feb. 12, 1999 (mailed) PCT/US98/24441.

Primary Examiner—Mark L. Bell
Assistant Examiner—J. Pasterczyk
Attorney, Agent, or Firm—Joseph F. Reidy; Stephen D. Prodnuk

[57] ABSTRACT

The invention relates to a catalyst composition for olefin polymerization comprising metallocene complexes and novel cocatalysts belonging to the group of perfluorinated oligoarylaluminates, oligoarylthioaluminates and oligoarylaminoaluminates. These cocatalysts are produced by two alternative synthetic methods, either by reacting alkylalumoxanes with pentafluorophenol, pentafluorothiophenol, or with pentafluoroaniline, respectively; or in two-step processes comprising first reacting trialkylaluminum compounds with said perfluorinated agents and then by reacting the products of the first step with water. Catalyst systems containing these cocatalysts and metallocene complexes are active in polymerization and copolymerization reactions of ethylene and alpha-olefins.

18 Claims, No Drawings

OLEFIN POLYMERIZATION CATALYST BASED ON METALLOCENE COMPLEXES AND PERFLUORINATED OLIGOARYL DERIVATIVES OF ALUMINATES

FIELD OF THE INVENTION

The invention relates to new catalyst compositions for olefin polymerization. In particular, the invention relates to new cocatalysts for activating metallocene complexes of transition metals as olefin polymerization catalysts.

BACKGROUND OF THE INVENTION

Catalyst compositions comprising metallocene complexes activated by alkylalumoxane activators (or cocatalysts), were introduced to the art of polymerization catalysis in the mid-1970s. Alkylalumoxanes exhibit several inherent problems in use, such as a need for high (alumoxane):(metallocene) ratios to produce highly active catalyst compositions, high reactivity toward impurities (moisture, alcohols, etc.) and flammability. Accordingly, some of the developments in this area of catalysis involved a search for alternative cocatalysts capable of activating metallocene complexes.

The class of alkylalumoxanes comprises oligomeric linear and/or cyclic compounds represented by the formulas R—[Al(R)—O]$_n$-AlR$_2$ for linear oligomeric alumoxanes and [—Al(R)—O—]$_n$ for cyclic oligomeric alumoxanes where R is a $C_1$–$C_8$ alkyl group. If R is the methyl group, the compound is called methylalumoxane or MAO. MAO has been the most widely used cocatalyst in metallocene catalyst systems.

SUMMARY OF THE INVENTION

The invention relates to catalyst compositions for olefin polymerization comprising metallocene complexes and novel cocatalysts belonging to the group of perfluorinated oligoarylaluminates, perfluorinated oligoarylthioaluminates, and perfluorinated oligoarylaminoaluminates. Catalyst systems containing these cocatalysts and metallocene complexes are active in polymerization and copolymerization reactions of ethylene and alpha-olefins. The catalyst composition may be a homogeneous catalyst or a supported heterogeneous catalyst which takes the form of free flowing particles which comprise an activated metallocene catalyst. Contact of the cocatalyst and the metallocene complex can occur prior to, or concurrently with, introduction of the metallocene complex into a polymerization reactor.

DETAILED DESCRIPTION OF THE INVENTION

Metallocene complexes used in the catalyst compositions of this invention have the formula $Cp_xMA_yB_z$ in which Cp is an unsubstituted or substituted cyclopentadienyl group; M is zirconium, titanium or hafnium; and A and B belong to the group including a halogen atom, a hydrogen atom or an alkyl group. In the above formula of the metallocene compound, the preferred transition metal atom M is zirconium. In the above formula of the metallocene compound, the Cp group is an unsubstituted, a monosubstituted, disubstituted or a polysubstituted cyclopentadienyl group: and x is at least 1 and preferably is 2. The substituents on the cyclopentadienyl group can be preferably linear or branched $C_1$–$C_6$ alkyl groups. The cyclopentadienyl groups can also be a part of a bicyclic or a tricyclic moiety such as indenyl, tetrahydroindenyl, fluorenyl or a partially hydrogenated fluorenyl group, as well as a part of other substituted bicyclic or tricyclic moieties. In the case when x is equal to 2, the cyclopentadienyl groups can be also bridged by polymethylene or dialkylsilyl groups such as —CH$_2$—, —CH$_2$—CH$_2$—, —CR'R"—and —CR'R"—CR'R"— where R' and R" are alkyl groups of 1 to 4 carbon atoms or phenyl groups or hydrogen atoms, —Si(CH$_3$)$_2$—, —Si(CH$_3$)$_2$—CH$_2$—CH$_2$—Si(CH$_3$)$_2$—, and similar bridge groups. If the A and B substituents in the above formula of a metallocene compound are halogen atoms, they belong to the group of fluorine, chlorine, bromine or iodine; and y+z is 3 or less, provided that x+y+z equals the valence of M. If the substituents A and B in the above formula of the metallocene compound are alkyl groups, they are preferably linear or branched $C_1$–$C_8$ alkyl groups, such as methyl, ethyl, n-propyl, isopropyl, n-butyl, isobutyl, n-pentyl, n-hexyl or n-octyl.

Suitable metallocene compounds include:
bis(cyclopentadienyl)metal dihalides,
bis(cyclopentadienyl)metal hydridohalides,
bis(cyclopentadienyl)metal monoalkyl monohalides,
bis(cyclopentadienyl)metal dialkyls,
bis(indenyl)metal diahalides
bis(tetrahydroindenyl)metal dihalides, and
bis(fluorenyl)metal dihalides,
wherein the metal is titanium, zirconium, or hafnium; halide atoms are preferably chlorine; and the alkyl groups are $C_1$–$C_6$ alkyl groups. Illustrative but nonlimiting
examples of metallocene complexes include
bis(cyclopentadienyl)zirconium dichloride,
bis(cyclopentadienyl)titanium dichloride,
bis(cyclopentadienyl)hafnium dichloride,
bis(cyclopentadienyl)zirconium dimethyl,
bis(cyclopentadienyl)hafnium dimethyl,
bis(cyclopentadienyl)zirconium hydridochloride,
bis(cyclopentadienyl)hafnium hydridochloride,
bis(n-butylcyclopentadienyl)zirconium dichloride,
bis(n-butylcyclopentadienyl)hafnium dichloride,
bis(n-butylcyclopentadienyl)zirconium dimethyl,
bis(n-butylcyclopentadienyl)hafnium dimethyl,
bis(n-butylcyclopentadienyl)zirconium hydridochloride,
bis(n-butylcyclopentadienyl)hafnium hydridochloride,
bis(1,3-dimethylcyclopentadienyl)zirconium dichloride,
bis(pentamethylcyclopentadienyl)zirconium dichloride,
cyclopentadienylzirconium trichloride,
bis(indenyl)zirconium dichloride,
bis(4,5,6,7-tetrahydro-1-indenyl)zirconium dichloride, and
ethylene[bis(4,5,6,7-tetrahydro-1-indenyl)]zirconium dichloride.

In the catalyst compositions of the invention one or more of these metallocene complexes are contacted with a cocatalyst containing perfluorinated phenyl groups. Some of these cocatalysts are oligomeric products belonging to the class including perfluorinated arylaluminates, i.e., the compounds which can be represented by the formula

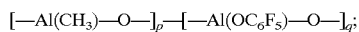

perfluorinated arylthioaluminates, i.e., the compounds which can be represented by the formula

perfluorinated arylaminoaluminates, i.e., the compounds which can be represented by the formula

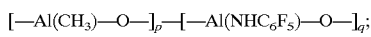

where the q:p ratio varies from 1:10 to 1:0.

These oligomeric cocatalysts are produced by any of two alternative synthetic methods. In the first method, the cocatalysts are produced by reacting alkylalumoxane [Al(R)—O]$_n$, where R is an alkyl group such a methyl, ethyl, n-propyl, n-butyl, isobutyl, n-hexyl or n-octyl group; with pentafluorophenol, $C_6F_5OH$; pentafluorothiophenol, $C_6F_5SH$; or with pentafluoroaniline, $C_6F_5NH_2$. Illustrative but nonlimiting examples of the alkylalumoxanes include methylalumoxane modified methylalumoxane (oligomeric alkylalumoxane products containing both methyl and isobutyl groups), isobutylalumoxane, and n-octylalumoxane.

The reaction between the alkylalumoxane and any of the said perfluorinated agents can be carried out in solution in any nonpolar solvent, such as a paraffinic hydrocarbon, a cycloalkane or an aromatic hydrocarbon, in a broad range of temperatures, from sub-zero to elevated temperatures. The optimum reaction temperatures are from 10 to 70° C. The reaction proceeds vigorously with the formation of an alkane RH. In the case when the R group in the alkylalumoxane is methyl or ethyl, the alkane RH evolves as a gas. It can be assumed that the reaction can be described by the following equations:

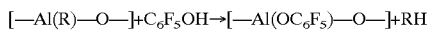

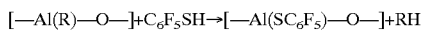

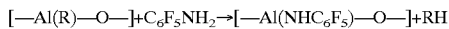

If an excess of the perfluorinated agent is used for the cocatalyst synthesis, it can be neutralized in a post-reaction with trimethylaluminum (TMA). The products of the post-reaction, aluminum phenoxides, phenothioxides or phenomides, such as $Me_2Al(OC_6F_5)$, $MeAl(O—C_6F_5)_2$, etc., are, by themselves, inert in the polymerization reactions.

The second method for producing cocatalysts of this invention consists of two consecutive stages. In the first stage, the said perfluorinated agent is reacted with a trialkylaluminum compound. The trialkylaluminum compounds used for the preparation of the cocatalyst have the general formula of $AlR_3$ wherein R are alkyl groups such a methyl, ethyl, n-propyl, n-butyl, isobutyl, n-hexyl or n-octyl group. The preferred trialkylaluminum compound is TMA. The reaction can be carried out in solution in a non-polar solvent, such as a paraffinic hydrocarbon, a cycloalkane or an aromatic hydrocarbon, in a broad range of temperatures, from sub-zero to elevated temperatures. The optimum reaction temperatures are from 10 to 70° C. The reaction proceeds vigorously with the formation of an alkane RH. In the case when the R group in the alkylaluminum compound formula $AlR_3$ is methyl or ethyl, the alkane RH evolves as a gas. It can be assumed that the reactions can be described by the following equations:

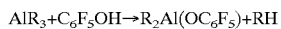

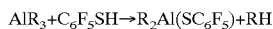

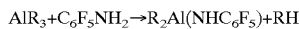

and produces alkylaluminum pentafluorophenoxides, alkylaluminum pentafluorophenylsulfides (or pentafluorothiophenolates), and alkylaluminum pentafluoroanilides, respectively. The ratios between $AlR_3$ and the perfluorinated agent can vary from 10:1 to 1:2; the most preferred ratios are from 1:1 to 1:2.

In the second stage of the preparation of the cocatalyst, the product of the first stage is contacted with water. This stage of the reaction can also be carried out in a broad range of temperatures, from sub-zero to elevated temperatures. The optimum reaction temperatures are from 10 to 70° C. The reaction is relatively slow and requires, depending on temperature, from 15 to 60 minutes to come to completion. It can be monitored by observing a slow disappearance of drops of water on the bottom of the reaction vessel. The total amount of water can be added to the reaction vessel in one step or in several consecutive steps. It is believed that these reactions proceed as shown:

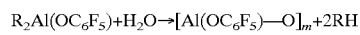

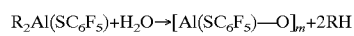

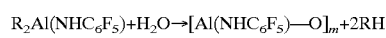

Depending on the ratio between $AlR_3$ and said perfluorinated agents in the first stage of the catalyst synthesis and the ratio between the products of the first stage and water, this method produces compounds which can be represented by the formulas:

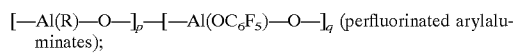 (perfluorinated arylaluminates);

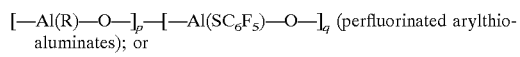 (perfluorinated arylthioaluminates); or

 (perfluorinated arylaminoaluminates);

where the q:p ratio varies from 1:10 to 1:0.

Another type of a cocatalyst of this invention containing perfluorinated phenyl groups is a solid material produced in the following sequence of two reactions:

(i) Solid $Al(OH)_3$ in a particulate form is slurried in an inert hydrocarbon and is reacted with a trialkylaluminum compound $AlR_3$ wherein the R groups are the same as described above. The reaction can be carried out using any non-polar solvent, such as a paraffinic hydrocarbon, a cycloalkane or an aromatic hydrocarbon, in a broad range of temperatures, from sub-zero to elevated temperatures. The optimum reaction temperatures are from 10 to 70° C. The reaction proceeds vigorously with the formation of an alkane RH. In the case when the R groups in the trialkylaluminum compound are methyl or ethyl, the alkane RH evolves as a gas. It can be assumed that the reaction can be described by the following equation:

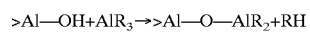

The reaction involves only OH groups on the surface of $Al(OH)_3$ crystals. To increase the fraction of such groups in $Al(OH)_3$, this solid material can be in advance ground or pulverized by any method suitable for grinding soft particular materials, including pulverization in a slurry with ultrasound equipment or with high-speed grinding devices. Experiments involving the measurement of evolved methane in reactions of $Al(OH)_3$ with TMA showed that approximately 20% of all Al atoms in well-ground $Al(OH)_3$ participate in the above reaction with $AlR_3$. The reaction between $Al(OH)_3$ and $AlR_3$ can be carried out at the $[AlR_3]$:$[Al(OH)_3]$ ratio ranging from 1:1 to 0.2:1. In the case when this ratio is above 0.3:1, the excess of free $AlR_3$ should be removed from the slurry by any suitable means.

(ii) The slurry of step (i) is treated with a perfluorinated agent belonging to the group including pentafluorophenol, $C_6F_5OH$; pentafluorothiophenol, $C_6F_5SH$; and pentafluoroaniline, $C_6F_5NH_2$. The agent is added to the slurry of step (i) in the amount corresponding to the molar ratio between the agent and the >Al—O—$AlR_2$ groups on the surface of $Al(OH)_3$ ranging from 1:1 to 2:1. These reactions also can be carried out using any nonpolar solvent, such as a paraffinic hydrocarbon, a cycloalkane or an aromatic hydrocarbon [most often, the same solvent as that used in step (i)], in a broad range of temperatures, from sub-zero to elevated temperatures. The optimum reaction temperatures are from 10 to 70° C. The reaction results in the formation of an alkane RH and is assumed to proceed according to the equations:

>Al—O—$AlR_2$+$C_6F_5XH$→>Al—O—Al(R)($XC_6F_5$)+RH, or

>Al—O—$AlR_2$+$2C_6F_5XH$→>Al—O—Al($XC_6F_5$)$_2$+2RH, depending on the ratio between the perfluorinated agent and the >Al—O—$AlR_2$ groups, where X is O, S, or NH for pentafluorophenol, pentafluorothiophenol, and pentafluoroaniline, respectively. The products of step (ii) and the catalyst compositions based on them are air-stable and are not flammable. The products of the step (ii) can be used, either as slurries in inert hydrocarbons, or after drying the solids, as cocatalysts for metallocene complexes of transition metals in olefin polymerization reactions.

The catalyst compositions of the invention can contain perfluorinated phenylaluminates and metallocene complexes in the molar $[Al]_{aluminate}:[M]_{metallocene}$ ratio ranging from 20,000 to 1.0, preferably from 5,000 to 100.

The catalyst compositions may be formed prior to their introduction into a polymerization reactor or in situ in the reactor by contacting the cocatalyst with metallocene complex. If the catalyst composition is supported, the support may be contacted with the cocatalyst to form the first contact product and then with the metallocene complex to form the second contact product; or the support can be contacted with the metallocene complex and then with the cocatalyst. Alternatively the catalyst components, the metallocene complex and the cocatalyst, can be pre-contacted and then impregnated into the support.

When the catalyst of the invention is a supported particulate catalyst, it comprises 0.01 to 4.0 wt. %, preferably 0.1 to 2.0 wt. % of a transition metal, provided by a metallocene complex of the transition metal.

After impregnation or deposition of the and the metallocene complex aluminate into the support, excess solvent is removed by evaporation at elevated temperature.

The catalyst compositions of this invention can be fed to a solution reactor, a slurry reactor or a fluidized bed gas-phase reactor for polymerization and copolymerization of ethylene and alpha-olefins. The temperature of polymerization can range from 25° to 125° C., but more generally between 50° and 115° C., at pressures of less than 10000 psi.

The catalysts can be used, for example, to produce high density polyethylene or linear low density polyethylene which is a copolymer of ethylene and a higher alpha-olefin such as 1-butene, 1-pentene, 1-hexene, 1-octene, 4-methyl-1-pentene, etc.

EXAMPLES

Example 1

Pentafluorophenol (0.218 g, 1.185 mmol) was dissolved in 5 cc of purified toluene in a 25-cc glass bottle sealed with a rubber septum and methylalumoxane (MAO, 2.38 mmol, 0.5 cc 4.75 M solution in toluene) was added to it at the [OH groups in phenol]:[MAO] ratio of 0.5. Vigorous reaction (ca. 5 min at room temperature) with methane evolution (the gas was released from the bottle through a syringe needle) ensued resulting in the formation of colorless solution. Based on known structure of MAO, the reaction product can be described as an oligomer containing units of two types, [Al($CH_3$)O] and [Al(OR)O] where R is a perfluorinated phenyl group $C_6F_5$. The ratio between the contents of both groups is determined by the ratio between MAO and the phenol.

The above product was tested as a cocatalyst in combination with a bridged metallocene complex $C_2H_4(indenyl)_2ZrCl_2$ (0.00147 mmol) under ethylene/1-hexene copolymerization conditions. The copolymerization reaction was carried out in a 500-cc stainless-steel autoclave equipped with a stirrer, a thermocouple, and several ports for adding reaction components. Prior to polymerization, the reactor was purged with nitrogen at 105–110° C. for 1 hour. The copolymerization reaction was carried out at 80° C. in n-heptane (230 cc) as a solvent, at a 0.64 mol/l 1-hexene concentration in solution and at a total reaction pressure of ca. 180 psig. TMA (1.35 mmol) was added to the mixture of the solvent and 1-hexene as an impurity scavenger. The amount of the above cocatalyst (expressed as mmol of Al) was 2.38 mmol and the [Al]:[Zr] ratio was 1620. The reaction produced, over a 19-min period, 25.6 g of an ethylene/1-hexene copolymer containing 1.8 mol. % of 1-hexene with a melt index of 7.7. Catalyst productivity was over 17,000 g PE/mmol Zr.

Example 2

The cocatalyst was prepared as described in Example 1 and was tested in combination with $C_2H_4(indenyl)_2ZrCl_2$ (0.00029 mmol) in an ethylene/1-hexene copolymerization reaction under condition of Example 1. The amount of the cocatalyst was 1.9 mmol and the [Al]:[Zr] ratio was 8200. The copolymerization reaction produced, over a 60-min period, 19.8 g of an ethylene/1-hexene copolymer containing 1.4 mol. % of 1-hexene with a melt index of 7.6. Catalyst productivity was over 67,000 g PE/mmol Zr.

Example 3

Pentafluorophenol (0.396 g, 2.15 mmol) was dissolved in 5 cc of toluene and was reacted, as described in Example 1, with MAO (1.9 mmol) for 1 hour at the [OH groups in phenol]:[MAO] ratio of 1.13. The cocatalyst was tested in combination with $C_2H_4(indenyl)_2ZrCl_2$ (0.00029 mmol) in an ethylene/1-hexene copolymerization reaction under condition of Example 1 (2.7 mmol of TMA was present in the reactor). The [Al]:[Zr] ratio was 8200. The copolymerization reaction produced, over a 60-min period, 34.2 g of an ethylene/1-hexene copolymer containing 1.5 mol. % of 1-hexene. Catalyst productivity was over 116,000 g PE/mmol Zr.

Example 4

Pentafluorophenol (0.565 g, 3.07 mmol) was dissolved in 5 cc of toluene and was reacted, as described in Example 1, with MAO (2.41 mmol) for 1 hour at the [OH groups in phenol]:[MAO] ratio of 1.27. This reaction product was completely inert when exposed to air and did not react with isopropanol. The cocatalyst was tested in combination with $C_2H_4(indenyl)_2ZrCl_2$ (0.00029 mmol) in an ethylene/1-hexene copolymerization reaction under condition of Example 1 (2.7 mmol of TMA was present in the reactor). The [Al]:[Zr] ratio was 7450. The reaction produced, over a 20-min period, 14.1 g of an ethylene/1-hexene copolymer containing 1.6 mol. % of 1-hexene. Catalyst productivity was over 48,000 g PE/mmol Zr.

Example 5

Pentafluorophenol (0.591 g, 3.2 mmol) was dissolved in 3 cc of toluene and was reacted for 30 min with TMA (2.4 mmol) mixed with 3 cc of toluene. Based on known chemistry of reactions between trialkylaluminum compounds and phenols, formation of dimethylaluminum perfluoro phenoxide $Me_2Al(OC_6F_5)$ is expected in this reaction. Then neat water was added to the solution in an amount of 46 μl (2.56 mmol) for 30 min to achieve an $[H_2O]$:[Al] ratio of 0.8 and apparently to produce oligopentafluorophenylaluminate containing predominantly [—Al($OC_6F_5$)—O—] units. The reaction product was tested in combination with $C_2H_4$(indenyl)$_2$ZrCl$_2$ (0.00029 mmol) in an ethylene/1-hexene copolymerization reaction under condition of Example 1 at the [Al]:[Zr] ratio of 6800. The reaction produced, over a 60-min period, 20.1 g of an ethylene/1-hexene copolymer containing 1.5 mol. % of 1-hexene. Catalyst productivity was over 68,000 g PE/mmol Zr.

Example 6

Pentafluorothiophenol (0.220 g, 1.01 mmol) was dissolved in 3 cc of toluene and was reacted, as described in Example 1, with MAO (2.15 mmol) for 1 hour at the [SH groups in thiophenol]:[MAO] ratio of 0.51. The cocatalyst was tested in combination with $C_2H_4$(indenyl)$_2$ZrCl$_2$ (0.00029 mmol) in an ethylene/1-hexene copolymerization reaction under condition of Example 1. The [Al]:[Zr] ratio was 7300. The reaction produced, over a 120-min period, 10.6 g of an ethylene/1-hexene copolymer containing 1.7 mol. % of 1-hexene. Catalyst productivity was over 36,000 g PE/mmol Zr.

Example 7

Pentafluoroaniline (0.204 g, 1.2 mmol) was dissolved in 3 cc of toluene and was reacted, as described in Example 1, with MAO (2.19 mmol) for 1 hour at the [$NH_2$ groups in aniline]:[MAO] ratio of 0.55. The cocatalyst was tested in combination with $C_2H_4$(indenyl)$_2$ZrCl$_2$ (0.00029 mmol) in an ethylene/1-hexene copolymerization reaction under condition of Example 1. The [Al]:[Zr] ratio was 7550. The reaction produced, over a 90-min period, 16.2 g of an ethylene/1-hexene copolymer containing 1.6 mol. % of 1-hexene. Catalyst productivity was over 55,000 g PE/mmol Zr.

Example 8

Pentafluoroaniline (0.412 g, 2.41 mmol) was dissolved in 3 cc of toluene and was reacted, as described in Example 1, with MAO (2.19 mmol) for 1 hour at the [$NH_2$ groups in aniline]:[MAO] ratio of 1.1. The cocatalyst was tested in combination with $C_2H_4$(indenyl)$_2$ZrCl$_2$ (0.00029 mmol) in an ethylene/1-hexene copolymerization reaction under condition of Example 1. The [Al]:[Zr] ratio was 7550. The reaction produced, over a 50-min period, 21.5 g of an ethylene/1-hexene copolymer containing 0.8 mol. % of 1-hexene. Catalyst productivity was over 73,000 g PE/mmol Zr.

Comparative Example 1

Pentafluorophenol (0.552 g, 3.0 mmol) was dissolved in 3 cc of toluene, the solution was flushed with purified nitrogen and slowly added to a 25-cc glass bottle sealed with a rubber septum containing 0.77 cc of 1.35 M solution of TMA in heptane mixed with 3 cc of toluene to reach the [phenol]:[Al] ratio of 3.0. A vigorous reaction resulted in a rapid methane evolution (the gas was released from the bottle through a syringe needle); the reaction product partially precipitated from solution. Based on known chemistry of reactions between trialkylaluminum compounds and phenols, formation of aluminum triphenoxide Al($OC_6F_5$)$_3$ is expected in this reaction. The reaction product was tested in combination with $C_2H_4$(indenyl)$_2$ZrCl$_2$ (0.00145 mmol) in an ethylene/1-hexene copolymerization reaction under condition of Example 1 and was found inactive.

Comparative Example 2

Para-trifluoromethylphenol (0.194 g, 1.2 mmol) was dissolved in 5 cc of toluene and was reacted, as described in Example 1, with MAO (2.41 mmol) for 1 hour at the [OH groups in phenol]:[MAO] ratio of 0.5. The reaction product was tested in combination with $C_2H_4$(indenyl)$_2$ZrCl$_2$ (0.00147 mmol) in an ethylene/1-hexene copolymerization reaction under condition of Example 1 at the [Al]:[Zr] ratio of 1640 and was found completely inactive.

Comparative Example 3

Phenol in an amount of 0.259 g (2.75 mmol) was dissolved in 3 cc of toluene and the solution was slowly added to a 50-cc glass bottle sealed with a rubber septum containing a mixture of 2.0 cc of 1.35 M solution of TMA in heptane and 5 cc of toluene. A reaction ensued resulting in a rapid methane evolution. Based on known chemistry of reactions between trialkylaluminum compounds and alcohols, formation of dimethylaluminum phenoxide $(CH_3)_2$Al—$OC_6H_5$ is expected in this reaction. Then neat water was added to the solution in two steps, first in an amount of 24 μl (1.35 mmol) to achieve an $[H_2O]$:[Al] ratio of 0.5 and apparently to produce methylphenoxydialumoxane $(C_6H_5O)(CH_3)$Al—O—Al($CH_3$)(O $C_6H_5$) and then, in the second step, in an amount of 22 μl (1.22 mmol) to reach the total $[H_2O]$:[Al] ratio of 0.9:1. The reaction product was tested in combination with $C_2H_4$(indenyl)$_2$ZrCl$_2$ (0.00147 mmol) in an ethylene/1-hexene copolymerization reaction under condition of Example 1 at the [Al]:[Zr] ratio of 1860 and was found to have a very poor activity, ca. 1,500 g/mmol Zr in a 120-min run.

Examples 1–8 show that aluminum derivatives containing [—Al($OC_6F_5$)—O—], [—Al($SC_6F_5$)—O—] and [—Al($NHC_6F_5$)—O—] groups with perfluorinated phenyl rings are effective as cocatalysts in olefin polymerization and copolymerization reactions with metallocene complexes whereas products of a similar structure derived from non-fluorinated phenols (Comparative Examples 2 and 3) do not make effective cocatalysts.

Example 9

Solid Al(OH)$_3$ in an amount of 0.10 g (1.28 mmol) was slurried in 15 cc on n-heptane and was ground using a tissue tearor (Biospec Products, Model 985–370) at a stirring speed of ca. 30,000 rpm for 15 min. The slurry was placed in a 50-cc serum bottle, sealed with a rubber septum, flushed with purified nitrogen, and 0.90 cc of 1.42 M solution of TMA in heptane was added to it. The reaction resulted in evolution of methane (which was released from the bottle though a syringe needle) and produced >Al—O—AlMe$_2$ species on the surface of solid Al(OH)$_3$. The slurry was separated from the solution containing unreacted TMA and was washed with purified n-heptane.

Separately, pentafluorophenol (0.152 g, 0.82 mmol) was dissolved in 5 cc of purified toluene in a 25-cc glass bottle sealed with a rubber septum, and the solution was added to the bottle with the above reaction product of $Al(OH)_3$ and TMA. A vigorous reaction ensued with methane evolution. It produced >Al—O—Al(Me)($OC_6F_5$) species on the surface of $Al(OH)_3$.

The above-described solid product was tested as a cocatalyst in combination with a metallocene complex $C_2H_4$(indenyl)$_2ZrCl_2$ (0.0015 mmol) under ethylene/1-hexene copolymerization conditions described in Example 1. The reaction produced, over a 180-min period, 28.7 g of an ethylene/1-hexene copolymer containing 2.2 mol. % of 1-hexene with a melt index of 1.3 and a melting point of ca. 114° C.

Example 10

The cocatalyst was prepared as described in Example 9, except for the amount of pentafluorophenol which was increased to 0.288 g (1.55 mmol). As a result, formation of >Al—O—Al($OC_6F_5$)$_2$ species on the surface of $Al(OH)_3$ is expected in this case. The solid was tested as a cocatalyst in combination with $C_2H_4$(indenyl)$_2ZrCl_2$ (0.0015 mmol) in an ethylene/1-hexene copolymerization reaction under condition of Example 1. The reaction produced, over a 180-min period, 28.9 g of an ethylene/1-hexene copolymer containing 2.0 mol. % of 1-hexene with a melt index of 1.7 and a melting point of ca. 115° C.

Thus it is apparent that there has been provided, in accordance with the invention a synthesis that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A catalyst composition for polymerization of alpha-olefins comprising the contact product of a metallocene complex of a transition metal of the formula $Cp_xMA_yD_z$ supported on an inert porous support wherein x is 1 or 2; M is titanium, zirconium or hafnium; Cp is a cyclopentadienyl group, a substituted cyclopentadienyl group, a cyclopentadienyl group that is a part of a bicyclic or a tricyclic moiety or, when x is 2, the two cyclopentadienyl groups are optionally bridged to each other;

and each of A and D is selected from the group consisting of a halogen atom, a hydrogen atom, an alkyl group, and combinations thereof; providing that x+y+z is equal to the valence of M; and a cocatalyst with perfluorinated phenyl groups of the general formula —[Al(R)O]$_p$—[Al($EC_6F_5$)O]$_q$—, wherein R is an alkyl group, E is a sulfur atom or an NH group; and the p:q ratio varies from 10:1 to 0:1.

2. The catalyst composition of claim 1, wherein x is 2.

3. The catalyst composition of claim 2, wherein M is Zr.

4. The catalyst composition of claim 3, wherein A and D are Cl.

5. The catalyst composition of claim 4, wherein Cp is n-butylcyclopentadienyl.

6. The catalyst composition of claim 4 wherein Cp is a tetrahydroindenyl group and where the two tetrahydroindenyl groups are linked by an ethylene bridge.

7. The catalyst composition of claim 4 wherein Cp is an indenyl group and where the two indenyl groups are linked by an ethylene bridge.

8. The catalyst composition of claim 4 wherein Cp is a tetrahydroindenyl group and where the two tetrahydroindenyl groups are linked by a dimethylsilyl bridge.

9. The catalyst composition of claim 1 wherein the alkyl group R in the general formula of the cocatalyst is selected from the group consisting of methyl, ethyl, propyl, isopropyl, n-butyl, isobutyl, n-pentyl, isopentyl, n-hexyl, isohexyl, n-heptyl, isoheptyl, n-octyl, and isooctyl groups.

10. The catalyst composition of claim 1 wherein the q:p ratio is 1.1.

11. The catalyst composition of claim 1 wherein the q:p ratio is 0.1:1.0.

12. In a process for activating a metallocene complex with a reaction product of a trialkylaluminum compound and water, the modification comprising contacting the trialkylaluminum compound with a compound selected from the group consisting of pentafluorothiophenol and pentafluoroaniline to form an intermediate product, reacting the intermediate product with water, and contacting the above hydrolysis product with said metallocene complex.

13. The catalyst composition of claim 1, wherein the perfluorinated phenyl cocatalyst of the formula —[Al(R)O]$_p$—[Al($EC_6F_5$)O]$_q$—, wherein E is a sulfur atom or an NH group, is produced by reacting an alkylalumoxane of the formula —[Al(R)O]$_{p+q}$— with pentafluorothiophenol, or pentafluoroaniline, respectively, in the amounts required to produce the cocatalyst at the p:q ratio from 10:1 to 0:1.

14. The catalyst composition of claim 1 wherein R is a methyl group.

15. The catalyst composition of claim 1, wherein the perfluorinated phenyl cocatalyst of the formula —[Al(R)O]$_p$—[Al($EC_6F_5$)O]$_q$—, wherein E is a sulfur atom or an NH group, is produced in steps comprising (i) reacting a trialkylaluminum compound of the formula $AlR_3$ with pentafluorothiophenol, or pentafluoroaniline, respectively, in the amounts corresponding to the molar [Al]:[perfluorinated agent] ratio from 2:1 to 1:1;

(ii) Reacting the product of step (i) with water at the molar [$AlR_3$ reaction product]: $H_2O$ ratio of 2:1 to 1:1.

16. The catalyst composition of claim 15 wherein the alkyl group R in the trialkylaluminum compound is selected from the group consisting of methyl, ethyl, propyl, isopropyl, n-butyl, isobutyl, n-pentyl, isopentyl, n-hexyl, isohexyl, n-heptyl, isoheptyl, n-octyl, and isooctyl groups.

17. The catalyst composition of claim 16 wherein the alkyl group R is a methyl group.

18. A catalyst composition for polymerization of α-olefins comprising the contact product of a metallocene complex of a transition metal of the formula $Cp_xMA_yD_z$ wherein x is 1 or 2; M is titanium, zirconium or hafnium; Cp is a cyclopentadienyl group, a substituted cyclopentadienyl group, a cyclopentadienyl group that is part of a bicyclic or tricyclic moiety or, when x is 2, the two cyclopentadienyl groups are optionally bridged to each other;

and each of A and D is selected from the group consisting of a halogen atom, a hydrogen atom, an alkyl group, and combinations thereof; providing that x+y+z is equal to the valence of M; and a solid cocatalyst containing perfluorinated phenyl groups and produced in steps comprising
  (i) reacting solid $Al(OH)_3$ with a trialkylaluminum compound of the formula $AlR_3$, wherein R is an alkyl group, at a molar ratio of 1:1 to 0.2:1 to form a product having >Al—O—$AlR_2$ groups on the surface of the $Al(OH)_3$;
  (ii) reacting the product of step (i) with pentafluorothiophenol or pentafluoroaniline in the amounts corresponding to the molar ratio between the perfluorinated agent and the >Al—O—$AlR_2$ groups on the surface of the $Al(OH)_3$ ranging from 2:1 to 1:1.

* * * * *